US012754492B2

(12) United States Patent
Shiotani

(10) Patent No.: US 12,754,492 B2
(45) Date of Patent: Oct. 6, 2026

(54) IMAGE CARRIER UNIT AND IMAGE FORMING APPARATUS

(71) Applicant: FUJIFILM Business Innovation Corp., Tokyo (JP)

(72) Inventor: Takekazu Shiotani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/361,094

(22) Filed: Jul. 28, 2023

(65) Prior Publication Data

US 2024/0329559 A1 Oct. 3, 2024

(30) Foreign Application Priority Data

Mar. 28, 2023 (JP) ................................ 2023-051239

(51) Int. Cl.
*G03G 15/04* (2006.01)
*G03G 15/043* (2006.01)
*G03G 21/16* (2006.01)

(52) U.S. Cl.
CPC ....... *G03G 15/04* (2013.01); *G03G 15/04036* (2013.01); *G03G 15/0409* (2013.01);
(Continued)

(58) Field of Classification Search
CPC ............ G03G 15/04; G03G 15/04036; G03G 15/0409; G03G 15/043; G03G 21/1666; G03G 2221/1654
See application file for complete search history.

(56) References Cited

U.S. PATENT DOCUMENTS 10,429,760 B2 10/2019 Tsukada
2004/0008333 A1 1/2004 Oda et al.
(Continued)

FOREIGN PATENT DOCUMENTS

JP 3457786 B2 10/2003
JP 2005-22259 A 1/2005
(Continued)

OTHER PUBLICATIONS

Dec. 15, 2023 Extended Search Report issued in European Patent Application No. 23189260.5.

*Primary Examiner* — Joseph S Wong
(74) *Attorney, Agent, or Firm* — Oliff PLC

(57) ABSTRACT

An image carrier unit includes: an image carrier having a circular cross-section and extending in one direction; an exposure device that radiates exposure light to the image carrier, the exposure device extending in the one direction and being opposed to the image carrier in a radial direction of the image carrier; a projecting member that is provided at both-end portions of the exposure device in the one direction, and projects to the image carrier along the radial direction; a formation member including an opposed surface that is opposed to a peripheral surface of the projecting member in a circumferential direction of the image carrier; a pressing member that presses the projecting member in the circumferential direction to press the peripheral surface of the projecting member against the opposed surface; and an adjusting member that adjusts a position of the exposure device relative to the image carrier by moving the exposure device in the radial direction with the projecting member pressed by the pressing member.

11 Claims, 13 Drawing Sheets

(52) U.S. Cl.
CPC ....... *G03G 15/043* (2013.01); *G03G 21/1666* (2013.01); *G03G 2221/1654* (2013.01)

(56) References Cited

U.S. PATENT DOCUMENTS

| | | | |
|---|---|---|---|
| 2007/0126852 A1 | 6/2007 | Fukutome et al. | |
| 2008/0145103 A1 | 6/2008 | Honobe et al. | |
| 2015/0165785 A1 | 6/2015 | Washington et al. | |
| 2022/0163903 A1* | 5/2022 | Katsumata | G03G 15/0216 |
| 2023/0004101 A1* | 1/2023 | Kasuya | F21K 9/237 |
| 2023/0062126 A1 | 3/2023 | Tonosu et al. | |
| 2023/0324827 A1* | 10/2023 | Ishidate | G03G 15/043 |

FOREIGN PATENT DOCUMENTS

| | | |
|---|---|---|
| JP | 4170029 B2 | 10/2008 |
| JP | 5195085 B2 | 5/2013 |
| JP | 5347822 B2 | 11/2013 |
| JP | 6355539 B2 | 7/2018 |

* cited by examiner

IMAGE CARRIER UNIT AND IMAGE FORMING APPARATUS

CROSS-REFERENCE TO RELATED APPLICATIONS

This application is based on and claims priority under 35 USC 119 from Japanese Patent Application No. 2023-051239 filed Mar. 28, 2023.

BACKGROUND

(i) Technical Field

The present disclosure relates to an image carrier unit, and an image forming apparatus.

(ii) Related Art

The image forming apparatus described in Japanese Unexamined Patent Application Publication No. 2005-22259 includes a focus adjustment device including a displacement mechanism, an optical writing device, a surface potential measuring device, an image carrier, and a CPU. The optical writing device writes a predetermined pattern in a portion near both ends of the image carrier, and the surface potential measuring device measures the surface potential of the portion. The CPU drives the displacement mechanism based on the measured surface potential, and adjusts the position of the optical writing device relative to the image carrier, thereby achieving a focused position.

SUMMARY

The image carrier unit includes: an image carrier having a circular cross-section and extending in one direction; and an exposure device that radiates exposure light to the image carrier, the exposure device extending in the one direction and being opposed to the image carrier in a radial direction of the image carrier.

The exposure device is supported by a support member in a movable manner in a radial direction of the image carrier relative to the image carrier. Specifically, both end portions of the exposure device in one direction are provided with a projecting member that projects to the image carrier in a radial direction of the image carrier, and the projecting member is fitted to the support member by a clearance fit. Thus, the exposure device is supported movably by the support member in a movable manner in the projection direction (the radial direction of the image carrier) of the projecting member.

However, in such a configuration, the positional accuracy of the exposure device in a circumferential direction of the image carrier is low.

Aspects of non-limiting embodiments of the present disclosure relate to improving the positional accuracy of the exposure device in a circumferential direction of the image carrier while allowing the exposure device to be moved in a radial direction of the image carrier, as compared to when the projecting member provided at both end portions of the exposure device is fitted to the support member by a clearance fit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image carrier unit including: an image carrier having a circular cross-section and extending in one direction; an exposure device that radiates exposure light to the image carrier, the exposure device extending in the one direction and being opposed to the image carrier in a radial direction of the image carrier; a projecting member that is provided at both-end portions of the exposure device in the one direction, and projects to the image carrier along the radial direction; a formation member including an opposed surface that is opposed to a peripheral surface of the projecting member in a circumferential direction of the image carrier; a pressing member that presses the projecting member in the circumferential direction to press the peripheral surface of the projecting member against the opposed surface; and an adjusting member that adjusts a position of the exposure device relative to the image carrier by moving the exposure device in the radial direction with the projecting member pressed by the pressing member.

BRIEF DESCRIPTION OF THE DRAWINGS

Exemplary embodiments of the present disclosure will be described in detail based on the following figures, wherein.

DETAILED DESCRIPTION

Figure 1:
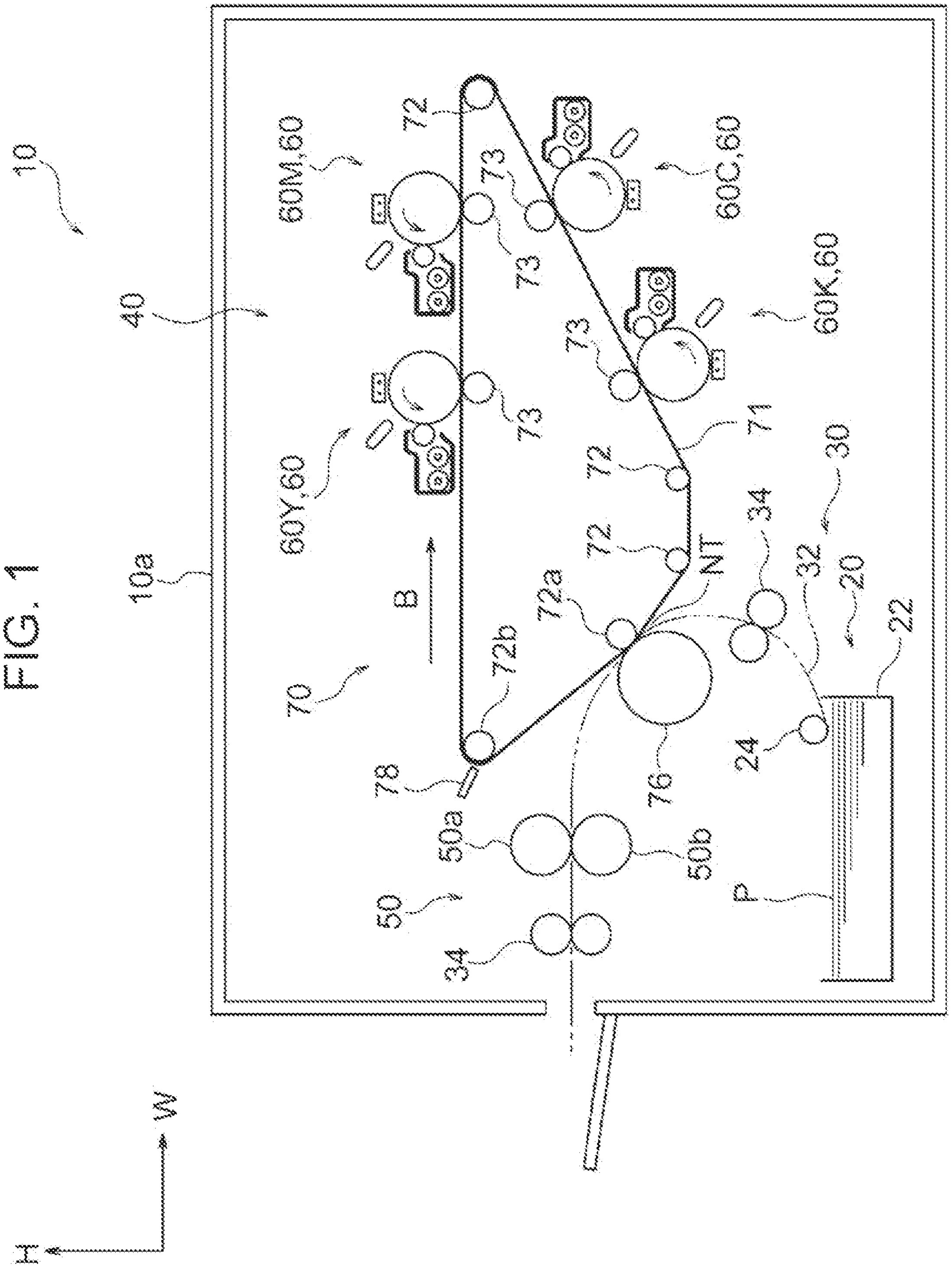
FIG. 1 is a schematic configuration view illustrating an image forming apparatus according to an exemplary embodiment of the present disclosure.

An example of an image carrier unit and an image forming apparatus according to an exemplary embodiment of the present disclosure will be described with reference to FIG. 1 to FIGS. 13A, 13B. Note that arrow H illustrated in the Figures indicates an apparatus up-down direction (vertical direction), arrow W indicates an apparatus width direction (horizontal direction), and arrow D indicates an apparatus depth direction (horizontal direction). Each of the drawings used for the description is schematic. The relationship between the dimensions of each element, and the dimensional ratio of each element illustrated in the drawings do not necessarily correspond to the actual ones. Furthermore, the relationships between the dimensions of each element, and the dimensional ratio of each element between multiple drawings do not necessarily correspond to each other.

(Image Forming Apparatus 10)

An image forming apparatus 10 according to the exemplary embodiment is an electrophotographic image forming apparatus that forms a toner image on a sheet member P as a recording medium. As illustrated in FIG. 1, the image forming apparatus 10 includes a storage unit 20, a transport unit 30, an image former 40, and a fixing device 50.

[Storage Unit 20, Transport Unit 30]

As illustrated in FIG. 1, the storage unit 20 includes a storage member 22 that stores sheet members P, and a delivery roller 24 that delivers a sheet member P stored in the storage member 22 to a transport path 32 for the sheet member P. The transport unit 30 includes a plurality of transport rollers 34 to transport the sheet member P along the transport path 32.

[Image Former 40]

As illustrated in FIG. 1, the image former 40 includes a toner image former 60 that forms a toner image, and a transfer device 70 that transfers the toner image formed by the toner image former 60 to the sheet member P.

—Toner Image Former 60—

The image forming apparatus 10 includes toner image formers 60Y, 60M, 60C, 60K for four colors in total: yellow (Y), magenta (M), cyan (C), and black (K). Note that the alphabet appended to the end of each symbol may be omitted when Y, M. C. K are not particularly distinguished.

The toner image former 60Y and the toner image former 60M are basically configurated in the same manner except for the toner to be used. The toner image former 60C and the toner image former 60K are basically configurated in the same manner except for the toner to be used.

Figure 2:
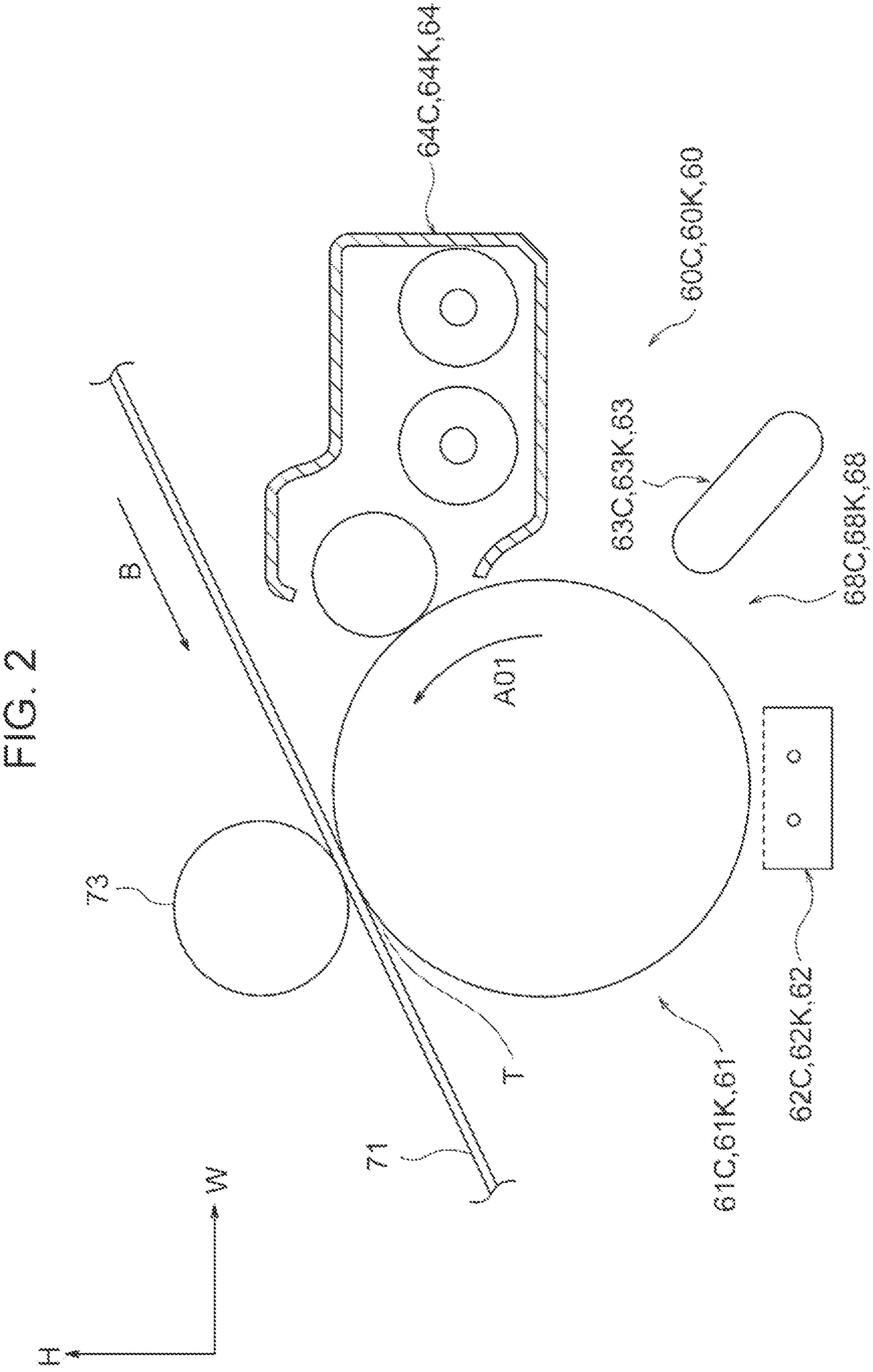
FIG. 2 is a configuration view illustrating a toner image former of the image forming apparatus according to the exemplary embodiment of the present disclosure.
Figure 3:
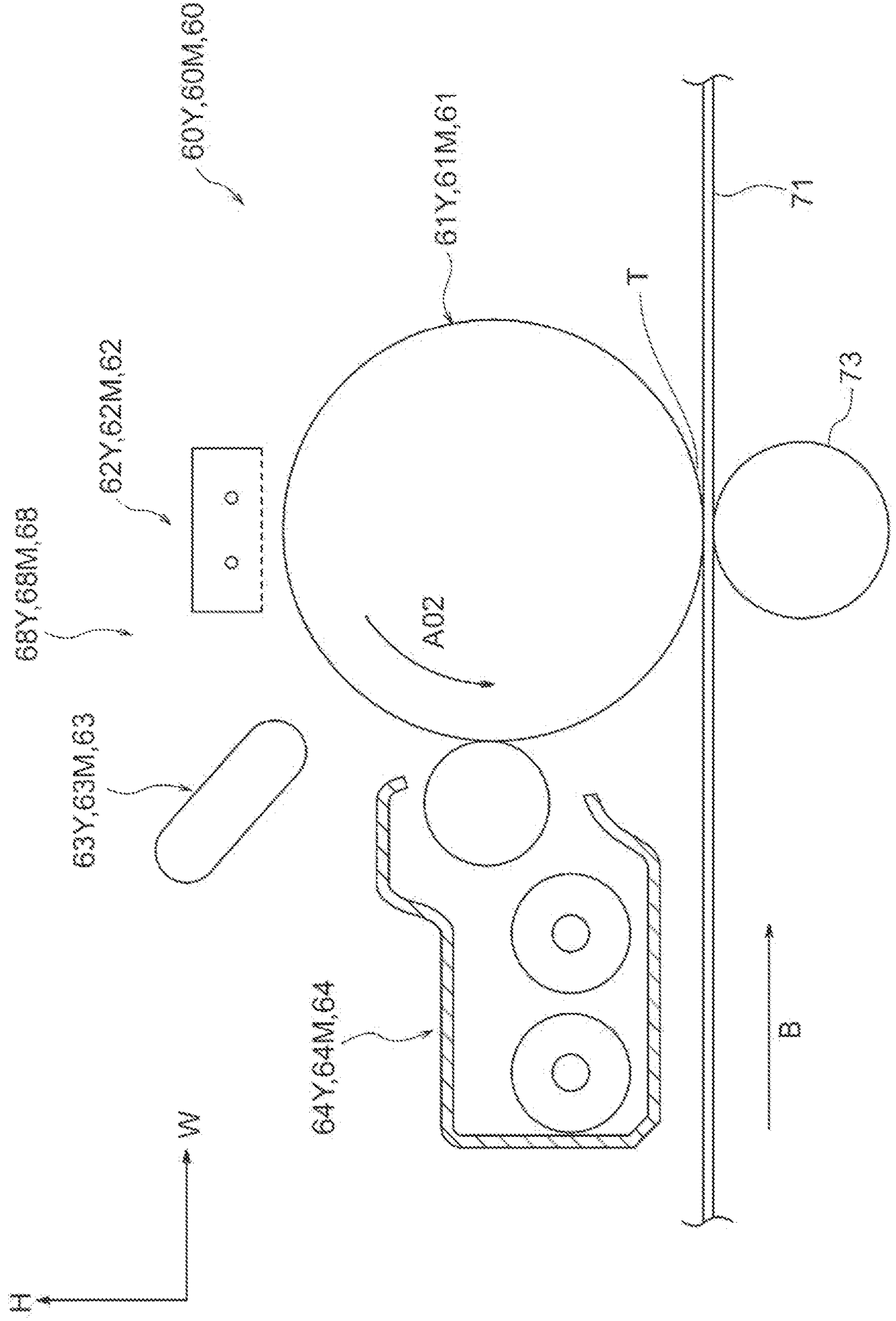
FIG. 3 is a configuration view illustrating the toner image former of the image forming apparatus according to the exemplary embodiment of the present disclosure.

As illustrated in FIG. 1, FIG. 2, the toner image formers 60C, 60K are arranged side by side along an inclined portion of a transfer belt 71 included in the transfer device 70. As illustrated in FIGS. 1, 3, the toner image formers 60Y, 60M are arranged side by side along a horizontal portion of the transfer belt 71 included in the transfer device 70.

As illustrated in FIG. 2, the toner image formers 60C, 60K include image carriers 61C, 61K that rotate in arrow A01 direction in FIG. 2 while being in contact with the transfer belt 71, and charging devices 62C, 62K that charge the image carriers 61C, 61K.

In addition, the toner image formers 60C, 60K include: exposure devices 63C, 63K that radiate exposure light to the image carriers 61C, 61K charged by the charging devices 62C, 62K to form an electrostatic latent image; and developing devices 64C, 64K that form a toner image by developing the electrostatic latent image using toner.

Image carrier units 68C, 68K are constituted by including the image carriers 61C, 61K, and the exposure devices 63C, 63K.

As illustrated in FIG. 3, the toner image formers 60Y, 60M include: image carriers 61Y, 61M that rotate in arrow A02 direction in FIG. 3 while being in contact with the transfer belt 71; and charging devices 62Y, 62M that charge the image carriers 61Y, 61M.

In addition, the toner image formers 60Y, 60M include: exposure devices 63Y, 63M that expose the image carriers 61Y, 61M charged by the charging devices 62Y, 62M to light to form an electrostatic latent image; and developing devices 64Y, 64M that form a toner image by developing the electrostatic latent image using toner.

Image carrier units 68Y, 68M are constituted by including the image carriers 61Y, 61M, and the exposure devices 63Y, 63M. Note that the details of the image carrier units 68C, 68K. 68Y, 68M will be described later.

—Transfer Device 70—

As illustrated in FIG. 1, the transfer device 70 includes the transfer belt 71 as an intermediate transfer body, multiple rollers 72, first transfer rollers 73, a second transfer roller 76, and a removal blade 78.

The transfer belt 71 has an endless form, and is wound on the multiple rollers 72 to have an inverted triangular posture. The toner image formers 60Y, 60M are arranged side by side along an upper horizontal portion of the transfer belt 71, and the toner image formers 60C. 60K are arranged side by side along an inclined portion of one side (right side in FIG. 1) of the transfer belt 71 in the apparatus width direction. In addition, rotational drive of at least one of the multiple rollers 72 causes the transfer belt 71 to circumferentially rotate in arrow B direction.

In the description below, a roller 72 among the multiple rollers 72, which is disposed to push out an inclined portion of the other side (left side in FIG. 1) of the transfer belt 71 in the apparatus width direction is referred to as a roller 72*a*, and a roller 72 on which a portion of the other side of the transfer belt 71 in the apparatus width direction is wound is referred to as a roller 72*b*.

In addition, as illustrated in FIG. 2, FIG. 3, the first transfer rollers 73 are disposed on the opposite side of the image carrier 61 of each color with respect to the transfer belt 71. As illustrated in FIG. 1, the second transfer roller 76 is disposed on the opposite side of the roller 72*a* with respect to the transfer belt 71, and the removal blade 78 is disposed on the opposite side of the roller 72*b* with respect to the transfer belt 71.

In this configuration, the first transfer rollers 73 transfers a toner image formed in the image carrier 61 to the transfer belt 71 at a first transfer position T (see FIG. 2, FIG. 3) between the image carrier 61 and the first transfer roller 73. The second transfer roller 76 then transfers to the sheet member P, a toner image transferred to the transfer belt 71, at a second transfer position NT between the transfer belt 71 and the second transfer roller 76. In addition, the removal blade 78 scrapes off residual toner remaining on the transfer belt 71 from the transfer belt 71.

[Fixing Device 50]

As illustrated in FIG. 1, the fixing device 50 includes a heating roller 50*a* that rotates, and a pressure roller 50*b* that is driven to rotate by the heating roller 50*a*, and presses the sheet member P to the heating roller 50*a* with the sheet member P interposed between the heating roller 50*a* and the pressure roller 50*b*.

Thus, the fixing device 50 is designed to heat and pressurize the sheet member P with a toner image transferred to fix the toner image onto the sheet member P. The sheet member P with a toner image fixed is designed to be discharged to the outside of a housing 10*a* of the image forming apparatus 10.

(Major Component Configuration)

Next, the details of the image carrier units 68C, 68K, 68Y, 68M will be described. First, the image carrier units 68C, 68K will be described, and subsequently, the image carrier units 68Y, 68M will be described.

Note that part of the image carrier units 68Y, 68M, which is different from the image carrier units 68C, 68K will be described mostly. The image carrier units 68C, 68K are basically configurated in the same manner except for the toner to be used, thus the image carrier unit 68C will be described. Similarly, since the image carrier units 68Y, 68M are basically configurated in the same manner except for the toner to be used, the image carrier unit 68Y will be described.

[Image Carrier Unit 68C]

Figure 4:
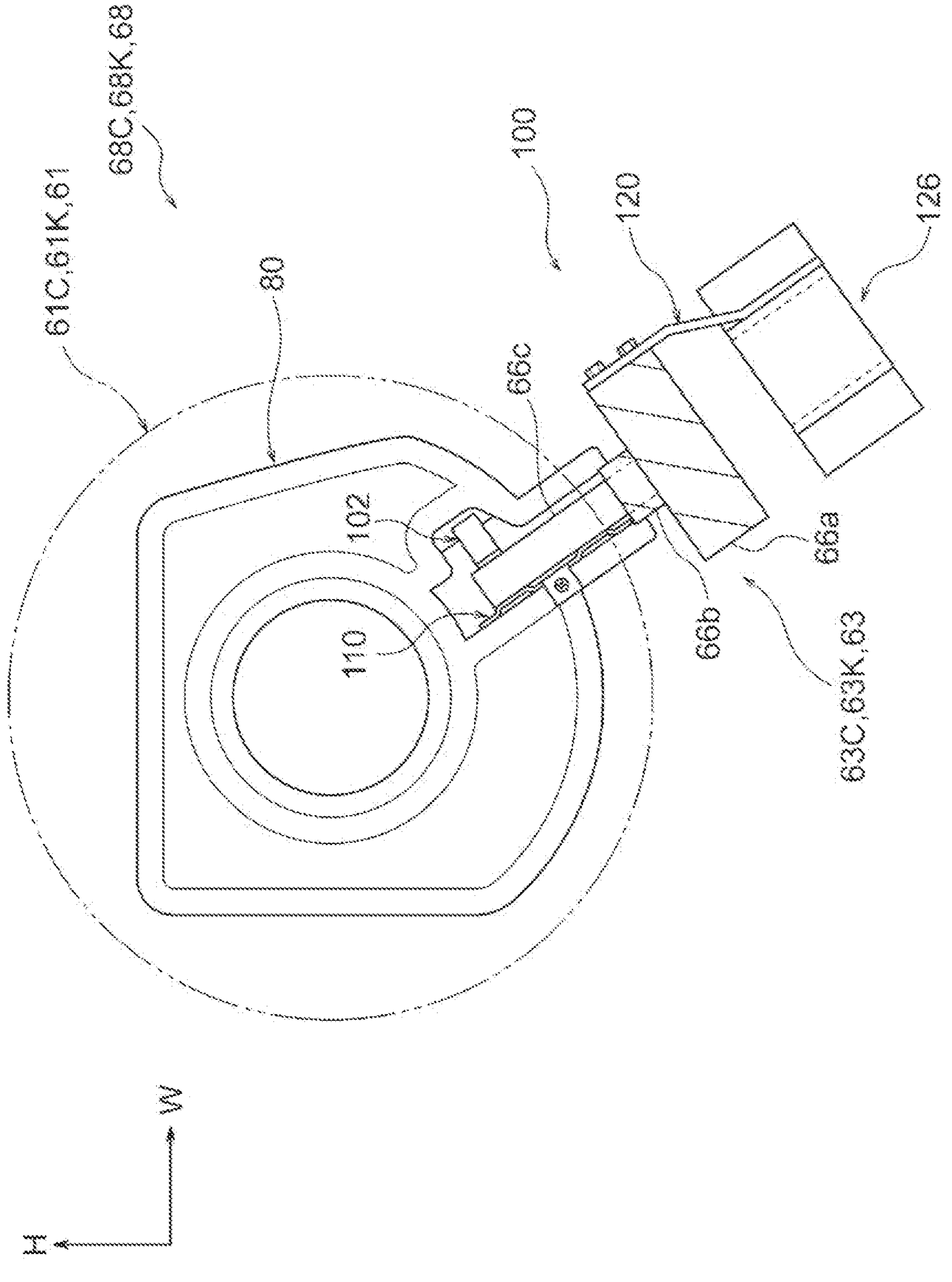
FIG. 4 is a configuration view illustrating an image carrier unit according to the exemplary embodiment of the present disclosure.

As illustrated in FIG. 4, the image carrier unit 68C includes an image carrier 61C that extends in the apparatus depth direction and has a circular cross section, an exposure device 63C, a support member 80 that rotatably supports the image carrier 61C, and a mounting mechanism 100 that mounts the exposure device 63C on the support member 80. The apparatus depth direction is an example of one direction.

In addition, the image carrier unit 68C includes an adjusting member 86 (see FIG. 6) that adjusts the position of the exposure device 63C relative to the image carrier 61C in a radial direction of the image carrier 61C.

—Exposure Device 63C—

As illustrated in FIG. 4, the exposure device 63C is a LED print head (LPH), and disposed on one side and below the image carrier 61C in the apparatus width direction as seen in the apparatus depth direction. In other words, the exposure device 63C is disposed diagonally below the image carrier 61C as seen in the apparatus depth direction.

Figure 5:
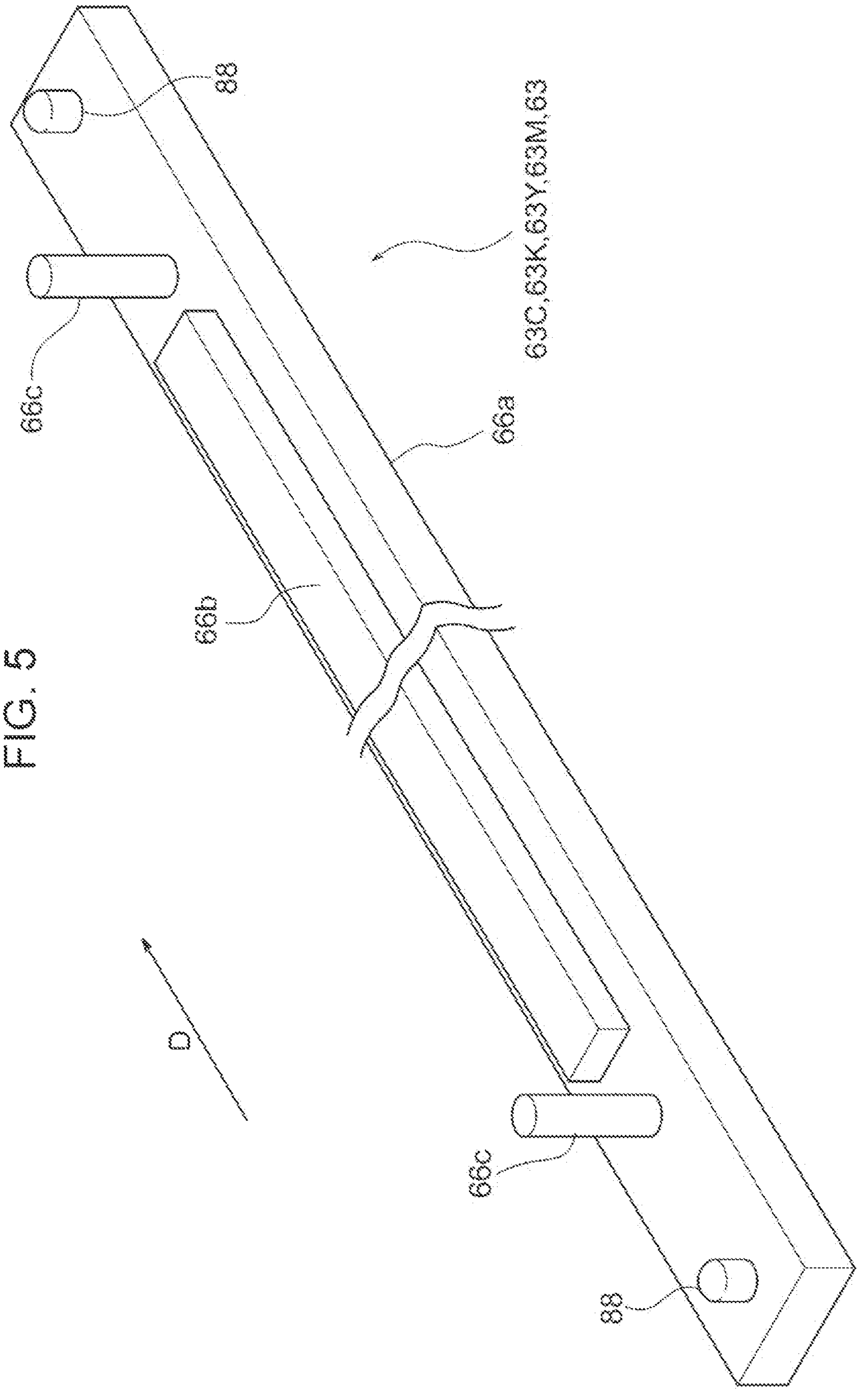
FIG. 5 is a perspective view illustrating an exposure device provided in the image carrier unit according to the exemplary embodiment of the present disclosure.

In addition, the exposure device 63C is opposed to the image carrier 61C in a radial direction of the image carrier 61C, and extends in the apparatus depth direction as illustrated in FIG. 5. The exposure device 63C includes a body member 66*a*, and an optical member 66*b* which projects from the body member 66*a* toward the image carrier 61C (see FIG. 4) and from which exposure light is emitted.

The body member 66*a* and the optical member 66*b* extend in the apparatus depth direction, and the body member 66*a* projects to both sides of the optical member 66*b* in the apparatus depth direction. The body member 66*a* has a rectangular cross section, and of the body member 66*a*, both-end portions projecting from the optical member 66*b* in the apparatus depth direction are provided with a pair of projecting members 66*c* that project toward the image carrier 61C. Specifically, the projecting members 66*c* are cylindrical, and made of chrome-plated metal, and project along a radial direction of the image carrier 61C. Note that the projection direction of each projecting member 66*c* may be along a radial direction, and it is even better if the projection direction is a radial direction.

—Adjusting Member 86—

Figure 6:
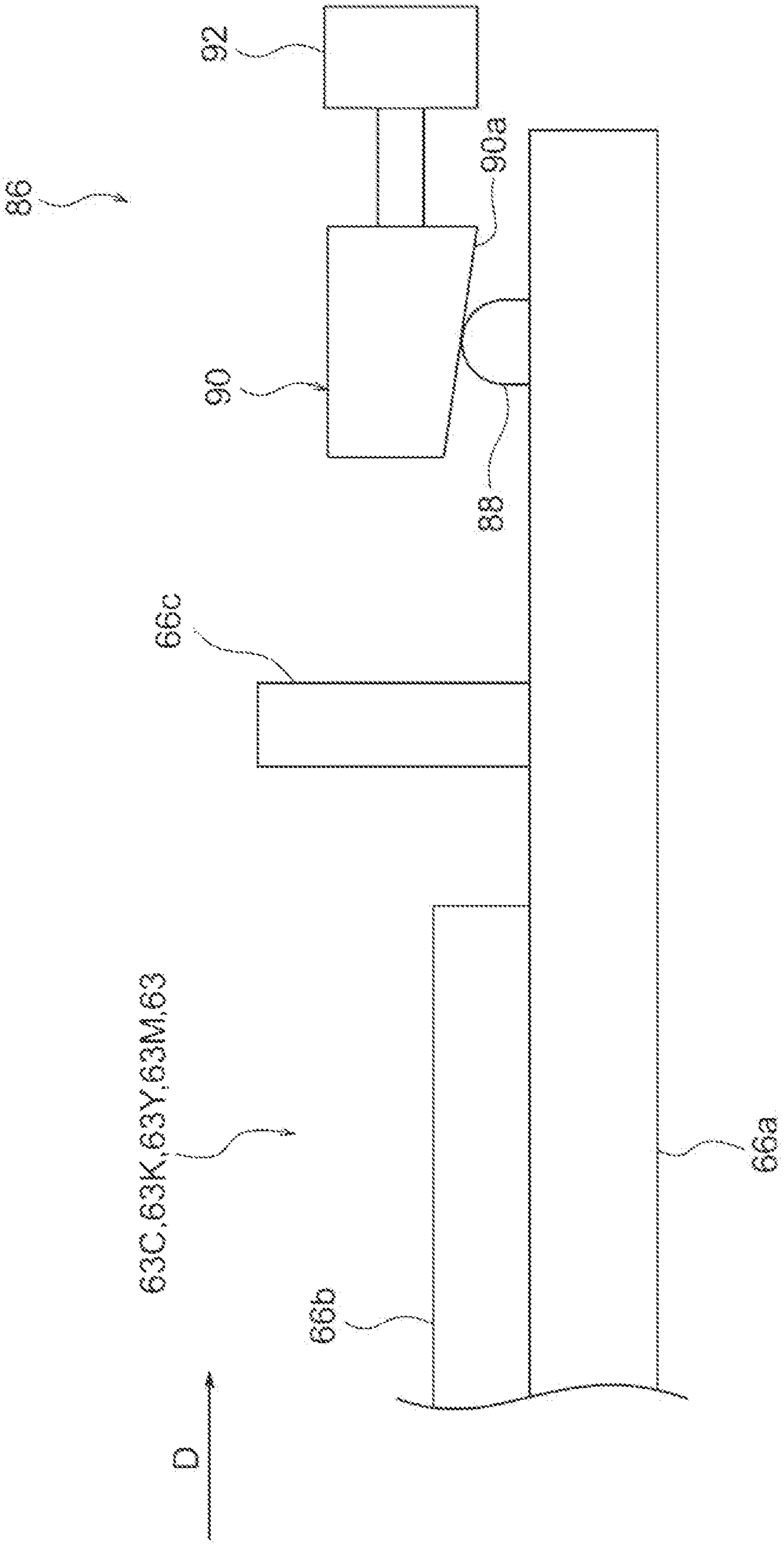
FIG. 6 is a configuration view illustrating an adjusting member provided in the image carrier unit according to the exemplary embodiment of the present disclosure.

As illustrated in FIG. 6, the adjusting member 86 is disposed at both-end portions of the exposure device 63 in the apparatus depth direction. The adjusting member 86 includes a hemispherical projection 88 that projects from the body member 66*a* of the exposure device 63 in a radial direction of the image carrier 61, and an adjuster 90 including a contact surface 90*a* which comes into contact with the tip end of the projection 88. In addition, the adjusting member 86 includes a mover 92 that moves the adjuster 90 in the apparatus depth direction, and an urging member (not illustrated) that urges the exposure device 63 so that the tip end of the projection 88 comes into contact with the contact surface 90*a*. The mover 92 and the urging member are fixed to a frame member (not illustrated) on which the support member 80 is mounted.

The contact surface 90*a* of the adjuster 90 is inclined with respect to the apparatus depth direction as seen in a circumferential direction of the image carrier 61. Therefore, it is designed that the exposure device 63 is separated in proximity to the image carrier 61 by moving the adjuster 90 back and forth in the apparatus depth direction by the mover 92.

—Support Member 80—

A pair of support members 80 are made of aluminum alloy and provided to interpose the image carrier 61C therebetween in the apparatus depth direction, and are mounted on a frame member which is not illustrated. The pair of support members 80 are symmetric, and have the same configuration, thus in the explanation below, the support member 80 disposed on the back side of the image carrier 61C in the apparatus depth direction will be described. The support member 80 is an example of a formation member.

Figure 7:
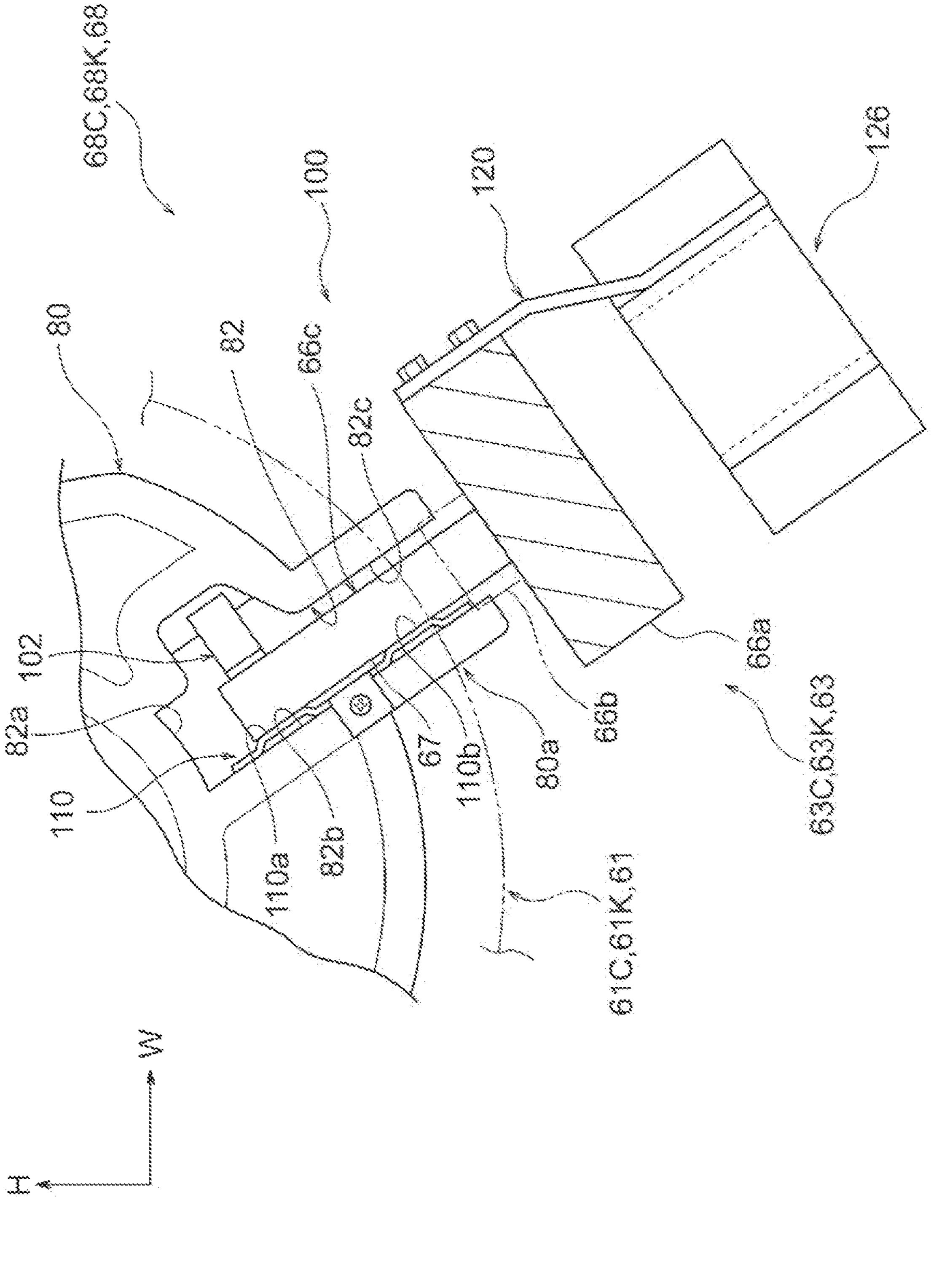
FIG. 7 is a front view illustrating a mounting configuration of the exposure device in the image carrier unit according to the exemplary embodiment of the present disclosure.

The support member 80 rotatably supports the image carrier 61C, and as illustrated in FIG. 7, a projection 80*a* is formed in the support member 80, the projection 80*a* projecting toward the exposure device 63C as seen in the apparatus depth direction.

In a portion, near the exposure device 63C, of the support member 80, a U-shaped cross-sectional recess 82 with the inside in the apparatus depth direction open is formed extending in a radial direction of the image carrier 61C. The projecting members 66*c* of the exposure device 63C are stored in the recess 82.

The recess 82 is constituted by including: a top surface 82*a* opposed to and spaced from the tip end of the projecting member 66*c* in a radial direction of the image carrier 61C; a pair of opposed surfaces 82*b*, 82*c* opposed to the projecting member 66*c* in a circumferential direction of the image carrier 61C; and a bottom surface 82*d* (see FIG. 9A) opposed to the projecting members 66*c* in the apparatus depth direction. For the convenience of the following description, the surface disposed on the clockwise side of the projecting member 66*c* in a circumferential direction of the image carrier 61C is referred to as an opposed surface 82*b*, and the surface disposed on the counterclockwise side of the projecting member 66*c* in a circumferential direction of the image carrier 61C is referred to as an opposed surface 82*c*.

—Mounting Mechanism 100—

As illustrated in FIG. 7, the mounting mechanism 100 includes: a pressing member 102 that presses a peripheral surface 67 of the projecting member 66*c* against the opposed surface 82*b*; a to-be-pressed member 110 disposed to cover the opposed surface 82*b*; and an urging member 120 mounted on the body member 66*a* of the exposure device 63C.

—Pressing Member 102 of Mounting Mechanism 100—

The pressing member 102 is formed by stacking and bending three pieces of plates made of stainless steel, and presses the peripheral surface 67 of the tip-end side (the upper-end side) portion of the projecting member 66*c* of the exposure device 63C to press the peripheral surface 67 of the projecting member 66*c* against the opposed surface 82*b*.

Figure 9A:
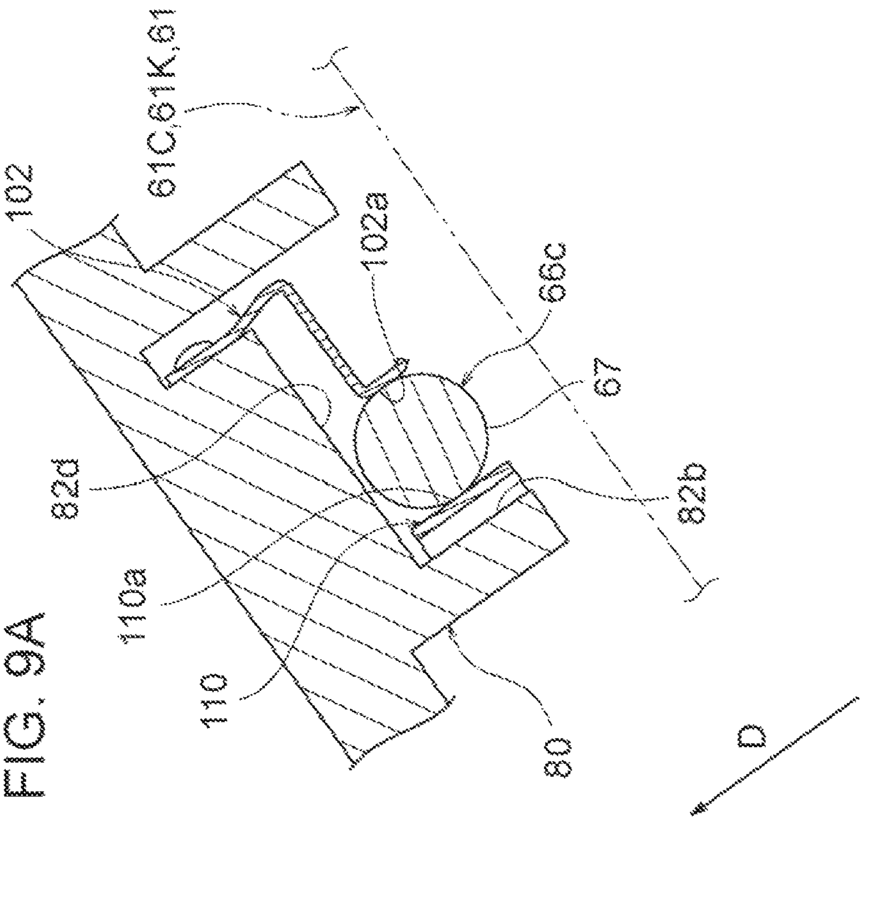
FIGS. 9A, 9B are sectional views illustrating the image carrier unit according to the exemplary embodiment of the present disclosure.

Specifically, as seen in a radial direction of the image carrier 61C, the pressing member 102 has a crank shape as illustrated in FIG. 9A, and the base-end portion of the pressing member 102 is mounted on the support member 80 using a mounting member (symbol is omitted). In addition, at the tip-end portion of the pressing member 102, a pressing surface 102*a* is formed, which comes into contact with the peripheral surface 67 of the projecting member 66*c* in a circumferential direction of the image carrier 61C. Furthermore, in a state where the peripheral surface 67 of the projecting member 66*c* and the pressing surface 102*a* are in contact with each other, the pressing member 102 is elastically deformed. With this elastic force, the pressing member 102 presses the peripheral surface 67 of the projecting member 66*c* against the opposed surface 82*b* to an extent to allow the exposure device 63C to move in a radial direction of the image carrier 61C.

The pressing member 102 is formed by stacking and bending three pieces of plates made of stainless steel. Thus, the difference in line lengths between inner bending and outer bending is reduced, as compared to when the pressing member is formed by bending one piece of plate made of stainless steel, thus plastic deformation of the pressing member 102 is prevented.

Here, "to an extent to allow the exposure device 63C to move in a radial direction of the image carrier 61C" means "to an extent to allow the exposure device 63C to move using the adjusting member 86 that adjusts the position of the exposure device 63C relative to the image carrier 61C".

—To-be-Pressed Member 110 of Mounting Mechanism 100—

Figure 9B:
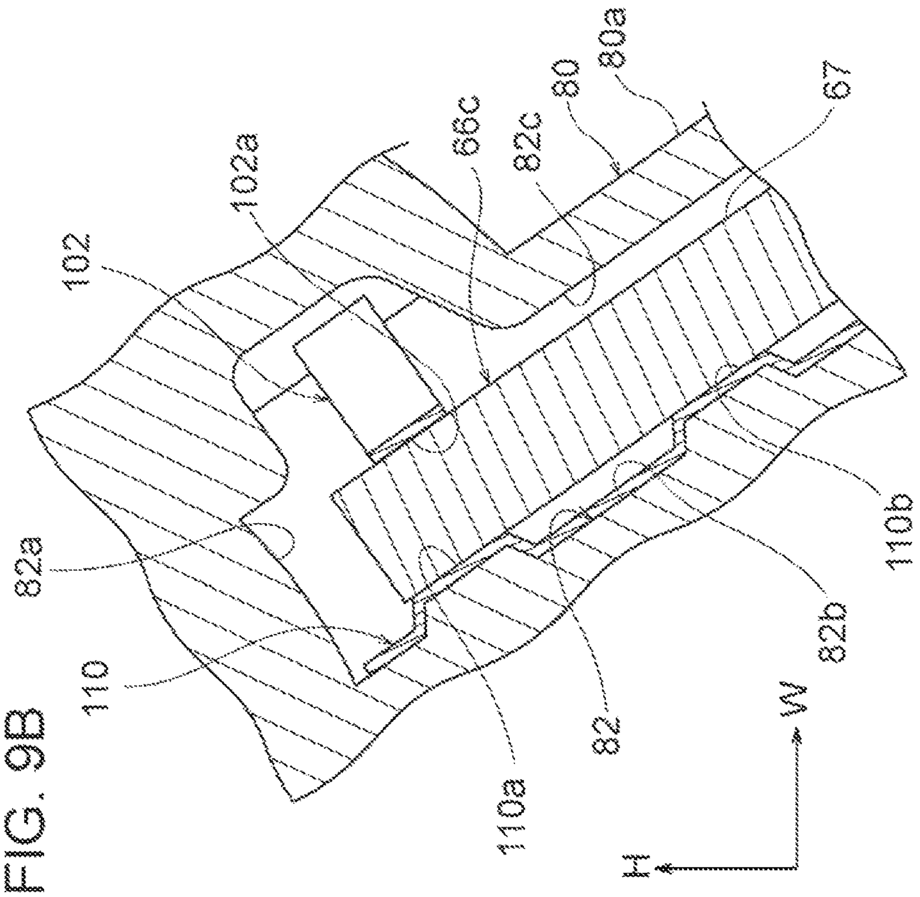

The to-be-pressed member 110 is formed by bending a plate made of stainless steel, and is disposed to cover the opposed surface 82*b* from the projecting member 66*c*, and mounted on the support member 80 by a mounting member (symbol is omitted) as illustrated in FIG. 7, FIG. 9B.

In the to-be-pressed member 110, a to-be-pressed section 110*a* and a to-be-pressed section 110*b* are formed, which project to the projecting member 66*c* from a portion layered on the opposed surface 82*b* to come into contact with the peripheral surface 67 of the projecting member 66*c*. Specifically, the to-be-pressed section 110*a* and the to-be-pressed section 110*b* are separated in a radial direction of the image carrier 61C, and the to-be-pressed section 110*b* is disposed outward (on the opposite side of the center of the image carrier 61C) of the to-be-pressed section 110*a* in a radial direction of the image carrier 61C. The to-be-pressed section 110*a* is disposed on the opposite side of the pressing surface 102*a* of the pressing member 102 with respect to the projecting member 66*c* in a circumferential direction of the image carrier 61C. Note that in this exemplary embodiment, the opposed surface 82*b* projects along the to-be-pressed section 110*a* and the to-be-pressed section 110*b*.

In this configuration, the elastically deformed pressing member 102 presses the peripheral surface 67 of the projecting member 66*c* against the opposed surface 82*b* via the to-be-pressed member 110. The projecting member 66*c* is positioned in a circumferential direction of the image carrier 61C by the projecting member 66*c* coming into contact with three points: the pressing surface 102*a* of the pressing member 102, the to-be-pressed section 110*a* of the to-be-pressed member 110, and the to-be-pressed section 110*b* of the to-be-pressed member 110. In other words, the exposure device 63C is positioned in a circumferential direction of the image carrier 61C by the projecting member 66*c* coming into contact with three points: the pressing surface 102*a* of the pressing member 102, the to-be-pressed section 110*a* of the to-be-pressed member 110, and the to-be-pressed section 110*b* of the to-be-pressed member 110.

Note that regarding the positioning of the exposure device 63C in the apparatus depth direction, the position of the exposure device 63C in the apparatus depth direction is determined by a positioner (not illustrated) coming into contact with the projecting member 66*c* from an inward position in the apparatus depth direction.

—Urging Member 120 of Mounting Mechanism 100—

Figure 8:
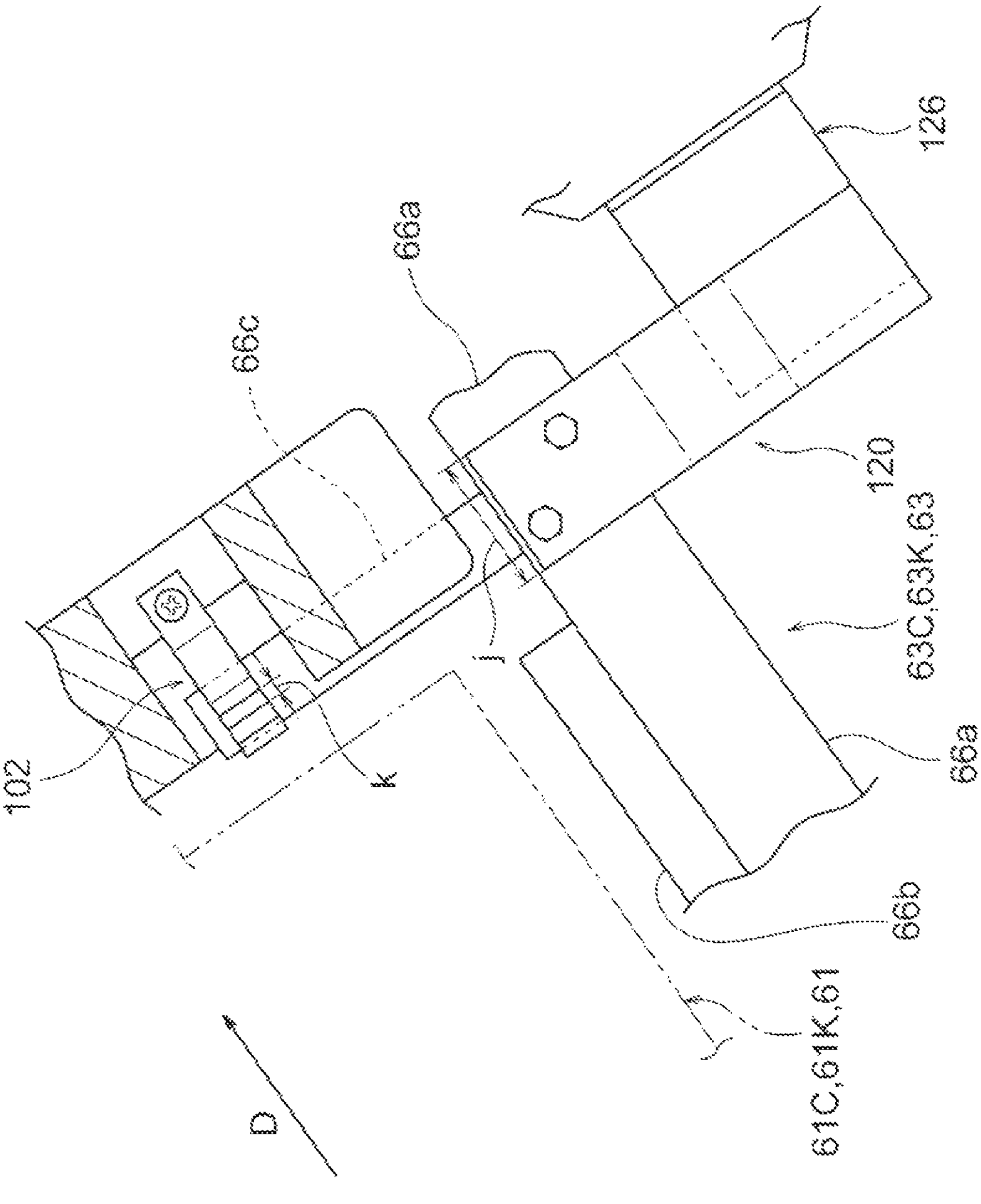
FIG. 8 is a view illustrating a mounting configuration of the exposure device in the image carrier unit according to the exemplary embodiment of the present disclosure, and is as viewed in a direction perpendicular to the projection direction of a projecting member as seen from the front.

The urging member 120 is formed by bending a plate made of stainless steel, and is mounted on the body member 66*a* of the exposure device 63C using a mounting member (symbol is omitted) as illustrated in FIG. 7, FIG. 8. Specifically, as seen in a circumferential direction of the image carrier 61C, the urging member 120 extends from the body member 66*a* of the exposure device 63C outward in a radial direction of image carrier 61C as illustrated in FIG. 8. The base-end portion of the urging member 120 is mounted on the body member 66*a* from one side (the clockwise side in FIG. 7) of the image carrier 61C in a circumferential direction.

The tip-end portion of the urging member 120 comes into contact with a bracket 126 from one side of the image carrier 61C in a circumferential direction, the bracket 126 being fixed to a frame member (not illustrated) on which the support member 80 is mounted. In a state where the tip-end portion of the urging member 120 is in contact with the bracket 126, the urging member 120 is elastically deformed. With this elastic force, the urging member 120 urges the exposure device 63C to the other side (the counterclockwise side in FIG. 7) of the image carrier 61C in a circumferential direction.

Here, the sum of a frictional force in a radial direction of the image carrier 61C generated in the exposure device 63C by the urging member 120 urging the exposure device 63C to the other side of the image carrier 61C in a circumferential direction, and a frictional force in a radial direction of the image carrier 61C generated in the exposure device 63C by the pressing member 102 pressing the peripheral surface 67 of the projecting member 66*c* against the opposed surface 82*b* is smaller than the force that causes the exposure device 63C to be moved in a radial direction of the image carrier 61C using the adjusting member 86.

That is, even in consideration of the urging force of the urging member 120 and the pressing force of the pressing member 102, the exposure device 63C can be moved using the adjusting member 86 that adjusts the position of the exposure device 63C relative to the image carrier 61C.

In this configuration, for example, even if vibration is applied to the image carrier unit 68C when being transported, vibration of the exposure device 63C relative to the image carrier 61C in a circumferential direction of the image carrier 61C is prevented.

In addition, as illustrated in FIG. 8, an area (area j in FIG. 8) where the urging member 120 urges the exposure device 63C, and an area (area k in FIG. 8) where the pressing member 102 presses the projecting member 66*c* overlap at least in part in the apparatus depth direction. Note that it is sufficient that the area j and the area k overlap at least in part in the apparatus depth direction, and it is even better if the entire area k is within the area j in the apparatus depth direction.

In this configuration, distortion in the exposure device 63C is prevented from occurring, as compared to when the area where the urging member 120 urges the exposure device 63C, and the area where the pressing member 102 presses the projecting member 66*c* are separated in the apparatus depth direction.

[Image Carrier Unit 68Y]

Figure 10:
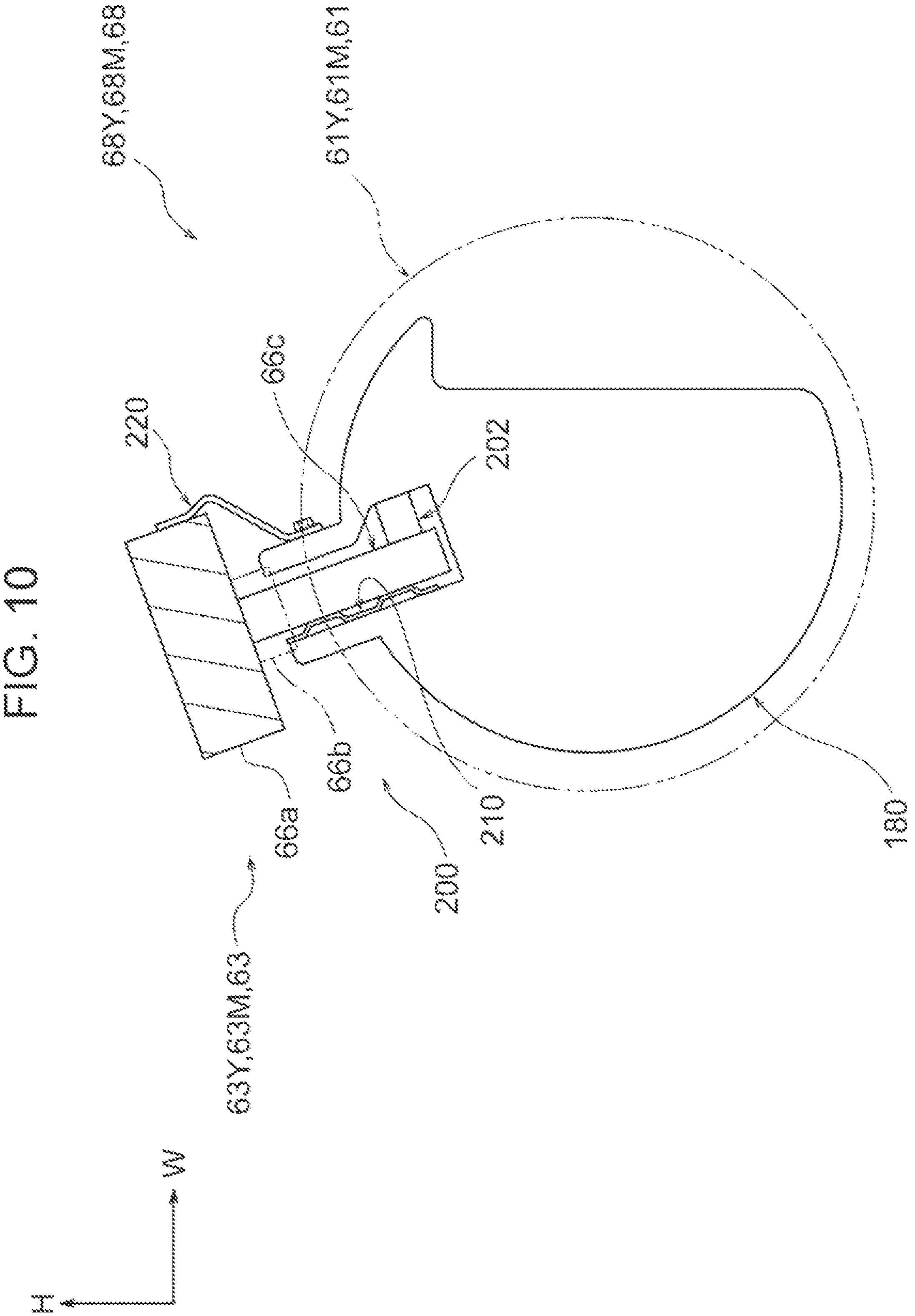
FIG. 10 is a configuration view illustrating the image carrier unit according to the exemplary embodiment of the present disclosure.

As illustrated in FIG. 10, the image carrier unit 68Y includes: the image carrier 61Y that extends in the apparatus depth direction and has a circular cross section; the exposure device 63Y; a support member 180 that rotatably supports the image carrier 61Y; and a mounting mechanism 200 that mounts the exposure device 63Y on the support member 180.

In addition, the image carrier unit 68Y includes the adjusting member 86 (scc FIG. 6) that adjusts the position of the exposure device 63Y relative to the image carrier 61Y in a radial direction of the image carrier 61Y.

—Exposure Device 63Y—

As illustrated in FIG. 10, the exposure device 63Y is a LED print head (LPH), and disposed on the other side and above the image carrier 61Y in the apparatus width direction as seen in the apparatus depth direction. In other words, the exposure device 63Y is disposed diagonally above the image carrier 61Y as seen in the apparatus depth direction.

In addition, the exposure device 63Y is opposed to the image carrier 61Y in a radial direction of the image carrier 61Y, and extends in the apparatus depth direction. The exposure device 63Y includes the body member 66*a*, and the optical member 66*b* which projects from the body member 66*a* toward the image carrier 61Y and from which exposure light is emitted.

The body member 66*a* and the optical member 66*b* extend in the apparatus depth direction, and the body member 66*a* projects to both sides of the optical member 66*b* in the apparatus depth direction. The body member 66*a* has a rectangular cross section, and of the body member 66*a*, both-end portions projecting from the optical member 66*b* in the apparatus depth direction are provided with a pair of projecting members 66*c* that project toward the image carrier 61Y. Specifically, the projecting members 66*c* are cylindrical, and extend along a radial direction of the image carrier 61Y.

—Support Member 180—

A pair of support members 180 are made of aluminum alloy and provided to interpose the image carrier 61Y therebetween in the apparatus depth direction. The pair of support members 180 are symmetric, and have the same configuration, thus in the explanation below, the support member 180 disposed on the back side of the image carrier 61Y in the apparatus depth direction will be described. The support member 180 is an example of a formation member.

Figure 11:
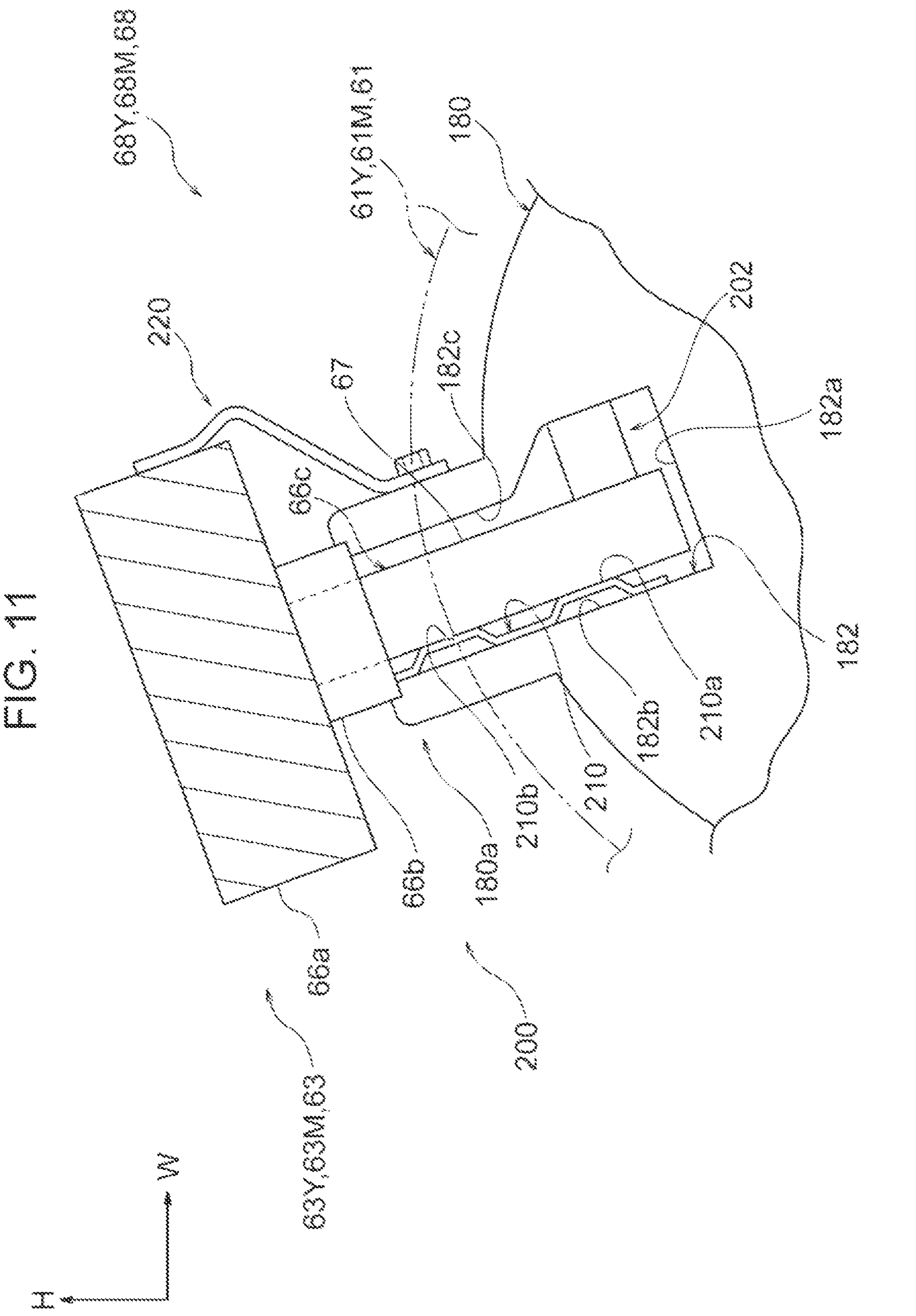
FIG. 11 is a front view illustrating a mounting configuration of the exposure device in the image carrier unit according to the exemplary embodiment of the present disclosure.

The support member 180 rotatably supports the image carrier 61Y, and as illustrated in FIG. 11, a projection 180*a* is formed in the support member 180, the projection 180*a* projecting toward the exposure device 63Y as seen in the apparatus depth direction.

In a portion, near the exposure device 63Y, of the support member 180, a U-shaped cross-sectional recess 182 with the inside in the apparatus depth direction open is formed extending in a radial direction of the image carrier 61Y. The projecting member 66*c* of the exposure device 63Y is stored in the recess 182.

The recess 182 is constituted by including: a top surface 182*a* opposed to and spaced from the tip end of the projecting member 66*c* in a radial direction of the image carrier 61Y; a pair of opposed surfaces 182*b*, 182*c* opposed to the projecting member 66*c* in a circumferential direction of the image carrier 61Y; and a bottom surface 182*d* (see FIG. 13A) opposed to the projecting member 66*c* in the apparatus depth direction. For the convenience of the following description, the surface disposed on the counterclockwise side of the projecting member 66*c* in a circumferential direction of the image carrier 61Y is referred to as an opposed surface 182*b*, and the surface disposed on the clockwise side of the projecting member 66*c* in a circumferential direction of the image carrier 61Y is referred to as an opposed surface 182*c*.

—Mounting Mechanism 200—

As illustrated in FIG. 11, the mounting mechanism 200 includes: a pressing member 202 that presses the peripheral surface 67 of the projecting member 66*c* against the opposed surface 182*b*; a to-be-pressed member 210 disposed to cover the opposed surface 182*b*; and an urging member 220 mounted on the projection 180*a* of the support member 180.

—Pressing Member 202 of Mounting Mechanism 200—

Figure 13B:
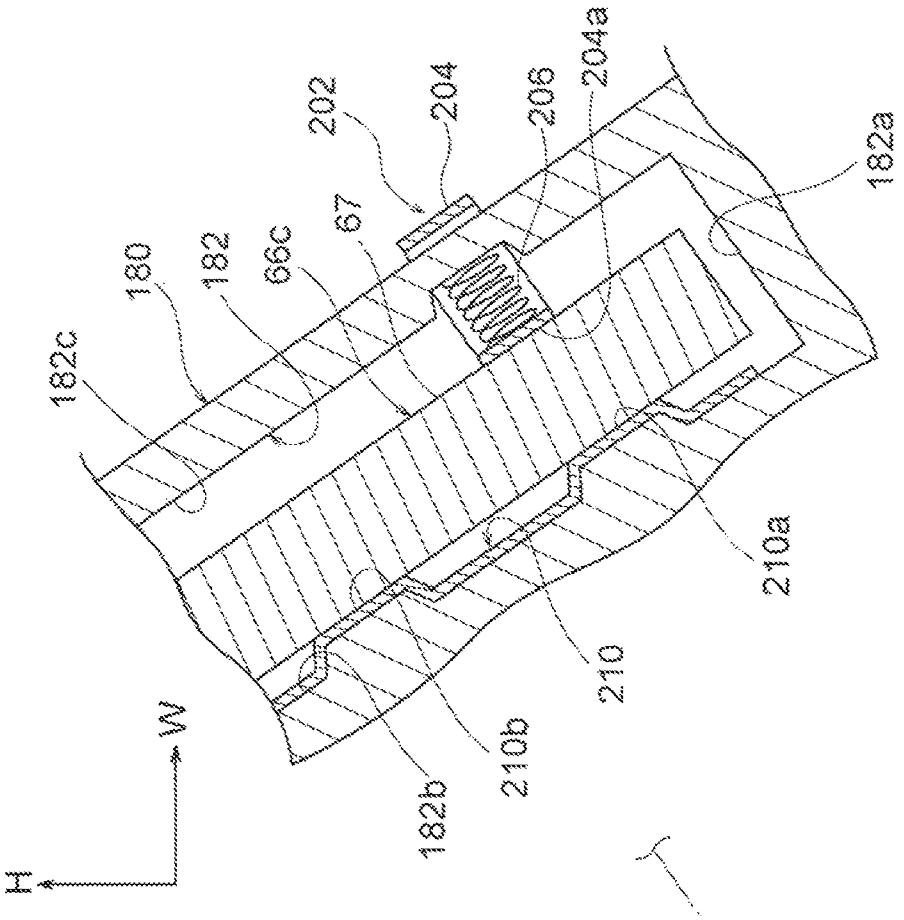
FIGS. 13A, 13B are sectional views illustrating the image carrier unit according to the exemplary embodiment of the present disclosure.
Figure 13A:
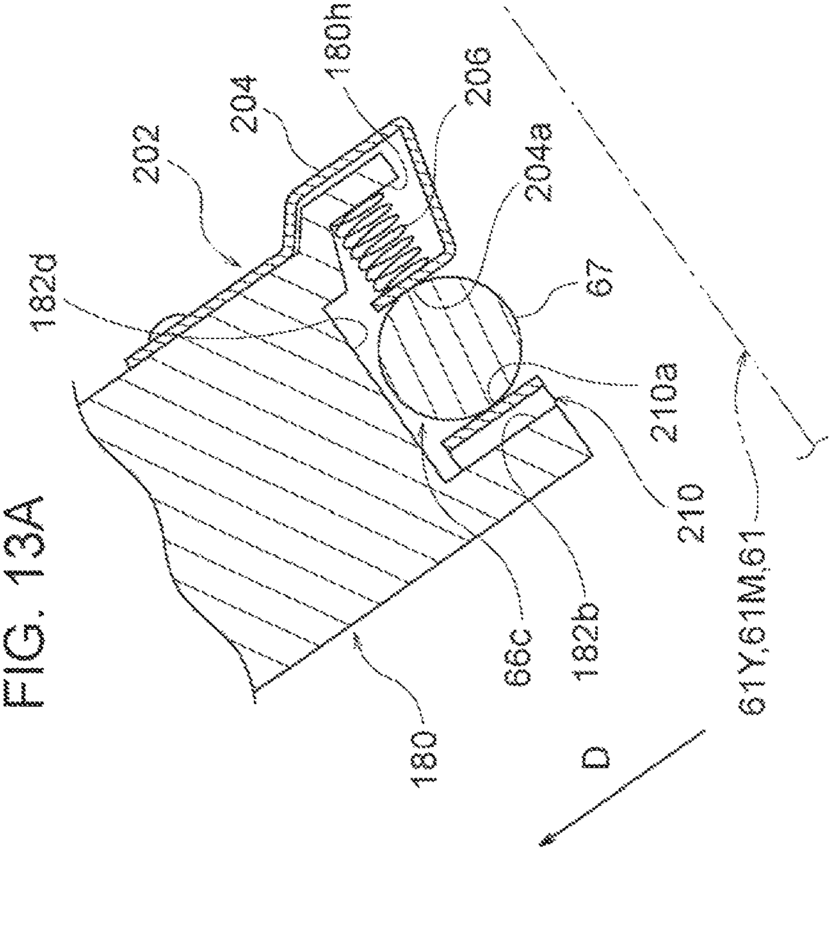

As illustrated in FIG. 13A, the pressing member 202 is constituted by including a pressing plate 204 and a pressing spring 206. The pressing plate 204 is formed by bending a plate made of stainless steel.

Specifically, the pressing plate 204 includes a U-shaped portion as seen in a radial direction of the image carrier 61Y. The base-end portion of the pressing plate 204 extends from the U-shaped portion to the back side in the apparatus depth direction via a step, and is mounted on the support member 180 using a mounting member (symbol is omitted). At the tip-end portion of the pressing plate 204, a pressing surface 204*a* is formed, which comes into contact with the peripheral surface 67 of the projecting member 66*c* in a circumferential direction of the image carrier 61Y.

Furthermore, the pressing spring 206 is disposed on the opposite side of the projecting member 66*c* with respect to the pressing surface 204*a*. The pressing spring 206 is a compression coil spring, and is disposed in a state of being compressed in a circumferential direction of the image carrier 61Y.

In addition, one end of the pressing spring 206 is in contact with the tip-end portion of the pressing plate 204, and the base-end of the pressing spring 206 is supported by a support surface 180*b* formed on the support member 180. Furthermore, the pressing spring 206 is elastically deformed in a state where the pressing spring 206 is interposed between the pressing plate 204 and the support surface 180*b*. With this elastic force, the pressing member 202 presses the peripheral surface 67 of the projecting member 66*c* against the opposed surface 182*b* to an extent to allow the exposure device 63Y to move in a radial direction of the image carrier 61Y.

Here, "to an extent to allow the exposure device 63Y to move in a radial direction of the image carrier 61Y" means "to an extent to allow the exposure device 63Y to move using the adjusting member 86 that adjusts the position of the exposure device 63Y relative to the image carrier 61Y".

—To-be-Pressed Member 210 of Mounting Mechanism 200—

The to-be-pressed member 210 is formed by bending a plate made of stainless steel, and is disposed to cover the opposed surface 182*b* from the projecting member 66*c*, and mounted on the support member 180 by a mounting member (not illustrated) as illustrated in FIG. 11, FIG. 13B.

In the to-be-pressed member 210, a to-be-pressed section 210*a* and a to-be-pressed section 210*b* are formed, which project to the projecting member 66*c* from a portion layered on the opposed surface 182*b* to come into contact with the peripheral surface 67 of the projecting member 66c. Specifically, the to-be-pressed section 210a and the to-be-pressed section 210b are separated in a radial direction of the image carrier 61Y, and the to-be-pressed section 210b is disposed outward (on the opposite side of the center of the image carrier 61Y) of the to-be-pressed section 210a in a radial direction of the image carrier 61Y. The to-be-pressed section 210a is disposed on the opposite side of the pressing surface 204a of the pressing plate 204 with respect to the projecting member 66c in a circumferential direction of the image carrier 61Y. Note that in this exemplary embodiment, the opposed surface 182b projects along the to-be-pressed section 210a and the to-be-pressed section 210b.

In this configuration, the pressing member 202 in which the pressing spring 206 is in a compressed state presses the peripheral surface 67 of the projecting member 66c against the opposed surface 182b via the to-be-pressed member 210. The projecting member 66c is positioned in a circumferential direction of the image carrier 61Y by the projecting member 66c coming into contact with three points: the pressing surface 204a of the pressing plate 204, the to-be-pressed section 210a of the to-be-pressed member 210, and the to-be-pressed section 210b of the to-be-pressed member 210. In other words, the exposure device 63Y is positioned in a circumferential direction of the image carrier 61Y by the projecting member 66c coming into contact with three points: the pressing surface 204a of the pressing plate 204, the to-be-pressed section 210a of the to-be-pressed member 210, and the to-be-pressed section 210b of the to-be-pressed member 210.

Note that regarding the positioning of the exposure device 63Y in the apparatus depth direction, the position of the exposure device 63Y in the apparatus depth direction is determined by a positioner coming into contact with the projecting member 66c from an inward position in the apparatus depth direction.

—Urging Member 220 of Mounting Mechanism 200—

Figure 12:
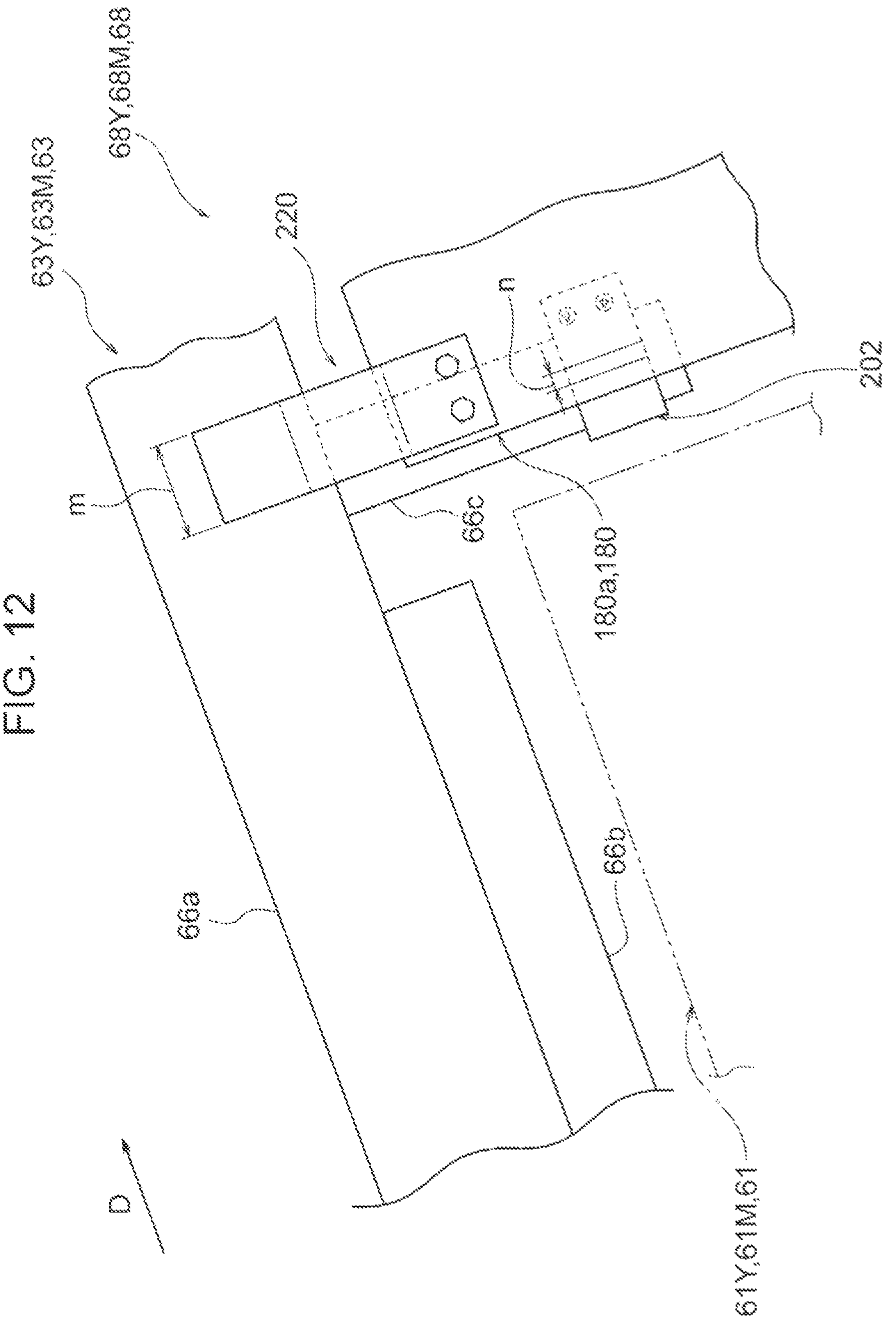
FIG. 12 is a view illustrating a mounting configuration of the exposure device in the image carrier unit according to the exemplary embodiment of the present disclosure, and is as viewed in a direction perpendicular to the projection direction of a projecting member as seen from the front.

The urging member 220 is formed by bending a plate made of stainless steel, and is mounted on the projection 180a of the support member 180 by a mounting member (symbol is omitted) as illustrated in FIG. 11, FIG. 12. Specifically, as seen in a circumferential direction of the image carrier 61Y, the urging member 220 extends from the projection 180a of the support member 180 outward in a radial direction of image carrier 61Y as illustrated in FIG. 12. The base-end portion of the urging member 220 is mounted on the projection 180a of the support member 180 from the other side (the counterclockwise side in FIG. 10) of the image carrier 61Y in a circumferential direction using a mounting member (symbol is omitted).

The tip-end portion of the urging member 220 comes into contact with the body member 66a of the exposure device 63Y from the other side of the image carrier 61Y in a circumferential direction. In a state where the tip-end portion of the urging member 220 is in contact with the body member 66a of the exposure device 63Y, the urging member 220 is elastically deformed. With this elastic force, the urging member 220 urges the exposure device 63Y to the other side (the counterclockwise side in FIG. 11) of the image carrier 61Y in a circumferential direction.

Here, the sum of a frictional force in a radial direction of the image carrier 61Y generated in the exposure device 63Y by the urging member 220 urging the exposure device 63Y to the other side of the image carrier 61Y in a circumferential direction, and a frictional force in a radial direction of the image carrier 61Y generated in the exposure device 63Y by the pressing member 202 pressing the peripheral surface 67 of the projecting member 66c against the opposed surface 182b is smaller than the force which causes the exposure device 63Y to be moved in a radial direction of the image carrier 61Y using the adjusting member 86.

That is, even in consideration of the urging force of the urging member 220 and the pressing force of the pressing member 202, the exposure device 63Y can be moved using the adjusting member 86 that adjusts the position of the exposure device 63Y relative to the image carrier 61Y.

In this configuration, for example, even if vibration is applied to the image carrier unit 68Y when being transported, vibration of the exposure device 63Y relative to the image carrier 61Y in a circumferential direction of the image carrier 61Y is prevented.

In addition, as illustrated in FIG. 12, an area (area m in FIG. 12) where the urging member 220 urges the exposure device 63Y, and an area (area n in FIG. 12) where the pressing member 202 presses the projecting member 66c overlap at least in part in the apparatus depth direction. Note that it is sufficient that the area m and the area n overlap at least in part in the apparatus depth direction, and it is even better if the entire area n is within the area m in the apparatus depth direction.

In this configuration, distortion in the exposure device 63Y is prevented from occurring, as compared to when the area where the urging member 220 urges the exposure device 63Y, and the area where the pressing member 202 presses the projecting member 66c are separated in the apparatus depth direction.

SUMMARY

As described above, in the image carrier units 68C, 68K, the pressing member 102 presses the peripheral surface 67 of the projecting member 66c against the opposed surface 82b in a circumferential direction of the image carriers 61C, 61K to an extent to allow the exposure devices 63C, 63K to move in a radial direction in the image carrier units 68C, 68K. Thus, as compared to when the projecting members provided at both end portions of the exposure device are fitted to the support member by a clearance fit, the positional accuracy of the exposure devices 63C, 63K in a circumferential direction of the image carriers 61C, 61K is improved while allowing the exposure devices 63C, 63K to be moved in a radial direction of the image carriers 61C, 61K.

In the image carrier units 68Y, 68M, the pressing member 202 presses the peripheral surface 67 of the projecting member 66c against the opposed surface 182b in a circumferential direction of the image carriers 61Y, 61M to an extent to allow the exposure devices 63Y, 63M to move in a radial direction in the image carrier units 68Y, 68M. Consequently, as compared to when the projecting members provided at both end portions of the exposure device are fitted to the support member by a clearance fit, the positional accuracy of the exposure devices 63Y. 63M in a circumferential direction of the image carriers 61Y, 61M is improved while allowing the exposure devices 63Y, 63M to be moved in a radial direction of the image carriers 61Y, 61M.

In the image carrier units 68C, 68K, the stainless steel to-be-pressed member 110 mounted on the support member 80 covers a portion of the opposed surface 82b, the portion being pressed by the peripheral surface 67 of the projecting member 66c. Thus, the support member 80 is prevented from wear, as compared to when the projecting member is directly pressed against the opposed surface of the support member.

In addition, in the image carrier units 68Y, 68M, the stainless steel to-be-pressed member 210 mounted on the support member 180 covers a portion of the opposed surface 182*b*, the portion being pressed by the peripheral surface 67 of the projecting member 66*c*. Thus, the support member 180 is prevented from wear, as compared to when the projecting member is directly pressed against the opposed surface of the support member.

In the image carrier units 68C, 68K, the to-be-pressed sections 110*a*, 110*b*, against which the peripheral surface 67 of the projecting member 66*c* is pressed are provided in the to-be-pressed member 110 at two locations separated in a radial direction of the image carriers 61C, 61K. Consequently, the positional accuracy of the exposure devices 63C, 63K in a circumferential direction of the image carriers 61C, 61K is improved, as compared to when a to-be-pressed section is provided only at one location in a radial direction.

In the image carrier units 68Y, 68M, the to-be-pressed sections 210*a*. 210*b*, against which the peripheral surface 67 of the projecting member 66*c* is pressed are provided in the to-be-pressed member 210 at two locations separated in a radial direction of the image carriers 61Y, 61M. Consequently, the positional accuracy of the exposure devices 63Y, 63M in a circumferential direction of the image carriers 61Y, 61M is improved, as compared to when a to-be-pressed section is provided only at one location in a radial direction.

In the image carrier units 68C, 68K, the urging member 120 urges the exposure devices 63C, 63K in a circumferential direction of the image carriers 61C, 61K at a position separated from the position where the pressing member 102 presses the projecting member 66*c*, in a radial direction of the image carriers 61C, 61K. Therefore, as compared to when the exposure device in an area other than the portion pressed by the pressing member is in no load state in a circumferential direction of the image carrier, vibration of the exposure devices 63C. 63K relative to the image carriers 61C, 61K is prevented even if vibration is applied to the image carrier units 68C, 68K when being transported.

In the image carrier units 68Y, 68M, the urging member 220 urges the exposure devices 63Y, 63M in a circumferential direction of the image carriers 61Y, 61M at a position separated from the position where the pressing member 202 presses the projecting member 66*c*, in a radial direction of the image carriers 61Y, 61M. Therefore, as compared to when the exposure device in an area other than the portion pressed by the pressing member is in no load state in a circumferential direction of the image carrier, vibration of the exposure devices 63Y. 63M relative to the image carriers 61Y, 61M is prevented even if vibration is applied to the image carrier units 68Y, 68M when being transported.

In the image carrier units 68C, 68K in the apparatus depth direction, the area where the urging member 120 urges the exposure devices 63C, 63K, and the area where the pressing member 102 presses the projecting member 66*c* overlap at least in part in the apparatus depth direction. Thus, distortion in the exposure devices 63C, 63K is prevented from occurring, as compared to when the area where the urging member urges the exposure devices, and the area where the pressing member presses the projecting member are separated in the apparatus depth direction.

In the image carrier units 68Y, 68M, in the apparatus depth direction, the area where the urging member 220 urges the exposure devices 63Y, 63M, and the area where the pressing member 202 presses the projecting member 66*c* overlap at least in part in the apparatus depth direction. Thus, distortion in the exposure devices 63Y, 63M is prevented from occurring, as compared to when the area where the urging member urges the exposure devices, and the area where the pressing member presses the projecting member are separated in the apparatus depth direction.

In the image forming apparatus 10, as compared to when the image carrier unit is provided in which the projecting member 66*c* that projects to the image carrier 61 is fitted to the support member by a clearance fit, the positional accuracy of the exposure device 63 is improved, thus the output image quality is improved.

Note that although the present disclosure has been described in detail through a specific exemplary embodiment, the present disclosure is not limited to those exemplary embodiment, and it is apparent to those skilled in the art that various other embodiments are possible within the scope of the present disclosure. For example, in the above exemplary embodiment, the image carrier unit 68 includes the to-be-pressed members 110, 210; however, the image carrier unit 68 may not include a to-be-pressed member. However, in this case, the effect achieved by providing the to-be-pressed members 110, 210 is not achieved.

In the above exemplary embodiment, the support members 80, 180 are made of aluminum alloy; however, the support members 80, 180 may be made of aluminum.

In the above exemplary embodiment, the to-be-pressed sections 110*a*, 110*b* and the to-be-pressed sections 210*a*, 210*b* are provided at two locations separated in a radial direction; however, a to-be-pressed section may be provided at one location. In this case, the effect achieved by providing the to-be-pressed sections at two locations separated in a radial direction is not achieved.

In the above exemplary embodiment, the to-be-pressed sections 110*a*, 110*b* and the to-be-pressed sections 210*a*, 210*b* are provided at two locations separated in a radial direction; however, to-be-pressed sections may be provided at multiple locations, and may be provided at three or more locations.

In the above exemplary embodiment, the urging members 120, 220 are provided, but may not be provided. In this case, the effect achieved by providing the urging members 120, 220 is not achieved.

The urging member and the pressing member may be integrated although it has not been specifically mentioned in the above exemplary embodiment.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image carrier unit comprising:

an image carrier having a circular cross-section and extending in one direction;

an exposure device that radiates exposure light to the image carrier, the exposure device extending in the one direction and being opposed to the image carrier in a radial direction of the image carrier;

a projecting member that is provided at both-end portions of the exposure device in the one direction, and projects to the image carrier along the radial direction;

a formation member including an opposed surface that is opposed to a peripheral surface of the projecting member in a circumferential direction of the image carrier;

a pressing member that presses the projecting member in the circumferential direction to press the peripheral surface of the projecting member against the opposed surface; and an adjusting member that adjusts a position of the exposure device relative to the image carrier by moving the exposure device in the radial direction with the projecting member pressed by the pressing member.

(((2)))

The image carrier unit according to (((1))), wherein the formation member is made of aluminum or aluminum alloy, the projecting member is made of steel, and the image carrier unit includes a stainless steel to-be-pressed member that is mounted on the formation member, and that covers a portion of the opposed surface, the portion against which the peripheral surface of the projecting member is pressed.

(((3)))

The image carrier unit according to (((2))), wherein the to-be-pressed member includes a plurality of to-be-pressed sections, against which the peripheral surface of the projecting member is pressed, the plurality of to-be-pressed sections being separated along the radial direction.

(((4)))

The image carrier unit according to any one of (((1))) to (((3))), further comprising an urging member that urges the exposure device in the circumferential direction of the image carrier at a position separated along the radial direction from a position where the pressing member presses the projecting member.

(((5)))

The image carrier unit according to (((4))), wherein an area where the urging member urges the exposure device in the one direction, and an area where the pressing member presses the projecting member in the one direction overlap at least in part in the one direction.

(((6)))

An image forming apparatus comprising:

the image carrier unit according to any one of (((1))) to (((5))); and a transfer device that transfers an image formed in the image carrier of the image carrier unit to a recording medium.

What is claimed is:

1. An image carrier unit comprising:

an image carrier having a circular cross-section and extending in one direction;

an exposure device that radiates exposure light to the image carrier, the exposure device extending in the one direction and being opposed to the image carrier in a radial direction of the image carrier;

a projecting member that is provided at both-end portions of the exposure device in the one direction, and projects to the image carrier along the radial direction;

a formation member including an opposed surface that is opposed to a peripheral surface of the projecting member in a circumferential direction of the image carrier;

a pressing member that presses the projecting member in the circumferential direction to press the peripheral surface of the projecting member against the opposed surface; and an adjusting member that adjusts a position of the exposure device relative to the image carrier by moving the exposure device in the radial direction with the projecting member pressed by the pressing member.

2. The image carrier unit according to claim 1, wherein the formation member is made of aluminum or aluminum alloy, the projecting member is made of steel, and the image carrier unit includes a stainless steel to-be-pressed member that is mounted on the formation member, and that covers a portion of the opposed surface, the portion against which the peripheral surface of the projecting member is pressed.

3. The image carrier unit according to claim 2, wherein the to-be-pressed member includes a plurality of to-be-pressed sections, against which the peripheral surface of the projecting member is pressed, the plurality of to-be-pressed sections being separated along the radial direction.

4. The image carrier unit according to claim 1, further comprising an urging member that urges the exposure device in the circumferential direction of the image carrier at a position separated along the radial direction from a position where the pressing member presses the projecting member.

5. The image carrier unit according to claim 4, wherein an area where the urging member urges the exposure device in the one direction, and an area where the pressing member presses the projecting member in the one direction overlap at least in part in the one direction.

6. An image forming apparatus comprising:

the image carrier unit according to claim 1; and a transfer device that transfers an image formed in the image carrier of the image carrier unit to a recording medium.

7. An image forming apparatus comprising:

the image carrier unit according to claim 2; and a transfer device that transfers an image formed in the image carrier of the image carrier unit to a recording medium.

8. An image forming apparatus comprising:

the image carrier unit according to claim 3; and a transfer device that transfers an image formed in the image carrier of the image carrier unit to a recording medium.

9. An image forming apparatus comprising:

the image carrier unit according to claim 4; and a transfer device that transfers an image formed in the image carrier of the image carrier unit to a recording medium.

10. An image forming apparatus comprising:

the image carrier unit according to claim 5; and a transfer device that transfers an image formed in the image carrier of the image carrier unit to a recording medium.

11. An image carrier unit comprising:

an image carrying means having a circular cross-section and extending in one direction;

an exposure means for radiating exposure light to the image carrying means, the exposure means extending in the one direction and being opposed to the image carrying means in a radial direction of the image carrying means;

a projecting means that is provided at both-end portions of the exposure means in the one direction, and projects to the image carrying means along the radial direction;

a formation means including an opposed surface that is opposed to a peripheral surface of the projecting means in a circumferential direction of the image carrying means;

a pressing means for pressing the projecting means in the circumferential direction to press the peripheral surface of the projecting means against the opposed surface; and an adjusting means for adjusting a position of the exposure means relative to the image carrying means by moving the exposure means in the radial direction with the projecting means pressed by the pressing means.

* * * * *